United States Patent
Gurovich et al.

(10) Patent No.: US 9,552,519 B2
(45) Date of Patent: Jan. 24, 2017

(54) PROVIDING VEHICLE OWNER'S MANUAL INFORMATION USING OBJECT RECOGNITION IN A MOBILE DEVICE

(71) Applicant: General Motors LLC, Detroit, MI (US)

(72) Inventors: Danilo E. Gurovich, Grosse Pointe Farms, MI (US); Keith A. Fry, Rochester Hills, MI (US); Shane M. McCutchen, Howell, MI (US); Daniel E. Rudman, West Bloomfield, MI (US); Joseph M. Goree, II, Detroit, MI (US)

(73) Assignee: General Motors LLC, Detroit, MI (US)

( * ) Notice: Subject to any disclaimer, the term of this patent is extended or adjusted under 35 U.S.C. 154(b) by 19 days.

(21) Appl. No.: 14/293,656

(22) Filed: Jun. 2, 2014

(65) Prior Publication Data

US 2015/0347848 A1   Dec. 3, 2015

(51) Int. Cl.
| | | |
|---|---|---|
| G06K 9/00 | (2006.01) | |
| G10L 15/22 | (2006.01) | |
| G06F 17/30 | (2006.01) | |
| G06T 11/60 | (2006.01) | |
| G10L 15/26 | (2006.01) | |

(52) U.S. Cl.
CPC ..... *G06K 9/00671* (2013.01); *G06F 17/30247* (2013.01); *G06K 9/00677* (2013.01); *G06T 11/60* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,720,680 | B2* | 5/2010 | Weng | G10L 15/1822 704/235 |
| 2003/0198368 | A1* | 10/2003 | Kee | G07C 9/00158 382/118 |
| 2007/0276584 | A1 | 11/2007 | Veliu et al. | |
| 2008/0133228 | A1* | 6/2008 | Rao | G10L 15/24 704/231 |
| 2010/0260373 | A1* | 10/2010 | Neven | G06K 9/228 382/100 |

(Continued)

OTHER PUBLICATIONS

Saltzman, "How to Search the Web with Siri—for Dummies", retrieved on Mar. 19, 2016, last updated Aug. 24, 2012, from: <http://www.dummies.com/howto/content/howtosearchthewebwithsiri.html>.*

(Continued)

*Primary Examiner* — Jason Heidemann
(74) *Attorney, Agent, or Firm* — Christopher DeVries; Reising Ethington P.C.

(57) ABSTRACT

There is provided a communication system that includes a vehicle and a mobile device, and a method uses that system to provide vehicle owner's manual information. The method includes the steps of: receiving a digital image of a portion of a vehicle; identifying an object of the vehicle in the digital image; associating the object with at least one reference object image stored in an object library comprising a plurality of reference object images; displaying owner's manual information based on the association; and storing at least a portion of the digital image in the object library as a new reference object image for future identifications.

20 Claims, 6 Drawing Sheets

(56) References Cited

U.S. PATENT DOCUMENTS

| | | | | |
|---|---|---|---|---|
| 2011/0150292 A1* | 6/2011 | Boncyk | ............. | G06F 17/30247 382/116 |
| 2013/0046592 A1* | 2/2013 | Ross | ....................... | G06F 3/048 705/14.4 |
| 2013/0144482 A1* | 6/2013 | Tuukkanen | ............ | G01B 11/00 701/29.6 |
| 2013/0170710 A1* | 7/2013 | Kuoch | ................ | G06K 9/00832 382/104 |
| 2013/0187952 A1* | 7/2013 | Berkovich | ................. | G01S 5/16 345/633 |
| 2013/0260360 A1* | 10/2013 | Baurmann | ................ | G06F 3/14 434/365 |
| 2013/0272574 A1* | 10/2013 | Cohen | .................... | G06K 9/228 382/103 |
| 2013/0293734 A1* | 11/2013 | Fan | ....................... | G06K 9/2081 348/222.1 |
| 2013/0343600 A1* | 12/2013 | Kikkeri | .............. | G06K 9/00221 382/103 |
| 2014/0279021 A1* | 9/2014 | MacNeille | ......... | G06Q 30/0266 705/14.63 |
| 2015/0109444 A1* | 4/2015 | Zhang | .................... | B60Q 9/008 348/148 |

OTHER PUBLICATIONS

Dillow, Clay, "BMW Augmented Reality Glasses Help Average Joes Make Repairs," Popular Science website: http://www.popsci.com/scitech/article/2009-09/bmw-developing-augmented-reality-help-mechanics, Sep. 3, 2009, pp. 1-7.

http://www.metaio.com/customers/case-studies/audi-ekurzinfo-app/.

Screenshots of Audi A3 at https://itunes.apple.com/de/app/audi-ekurzinfo/id436341817.

Press Release of "Metaio & Audi AG Release Interactive Augmented Reality Manual" at http:www.metaio.com/press/press-release/2013/metaio-audi-ag-release-interactive-augmented-reality-manual.

* cited by examiner

PROVIDING VEHICLE OWNER'S MANUAL INFORMATION USING OBJECT RECOGNITION IN A MOBILE DEVICE

TECHNICAL FIELD

The present invention relates to object detection in a vehicle using a mobile device.

BACKGROUND

Vehicles today are offering an increasing number of user-selectable functions, particularly for the driver. Historically, information concerning these selectable functions has been provided in an owner's manual typically carried in the vehicle glove compartment. More recently, the use of a camera-enabled Smartphone or tablet has been proposed for use in providing such information. eKurzinfo™ is one such system for which there is a publicly-available video clip illustrating its functionality.

In such a system, when a vehicle user is unfamiliar with a button or control, the user may use a camera device in the Smartphone or tablet and film the particular button or control. Information regarding the button then may be provided using the Smartphone's or tablet's display. In addition, the Smartphone or tablet may be used to assist in performing a maintenance routine (such as filling the coolant).

SUMMARY

According to an embodiment of the invention, there is provided a computer program product that includes a non-transitory computer readable medium having stored thereon program instructions for use by a camera-enabled mobile device. Upon execution by the mobile device, the program instructions stored on the computer readable medium cause the mobile device to carry out the steps of: receiving a digital image of a portion of a vehicle; identifying a primary object of the vehicle in the digital image; associating the primary object with at least one reference object image stored in an object library comprising a plurality of reference object images; displaying owner's manual information based on the association; and storing the digital image in the object library as a new reference object image for future identifications.

According to an embodiment of the invention, there is provided a computer program product that includes a non-transitory computer readable medium having stored thereon program instructions for use by a camera-enabled mobile device. Upon execution by the mobile device, the program instructions stored on the computer readable medium cause the mobile device to carry out the steps of: receiving a digital scan containing at least one vehicle object; receiving speech audio containing one or more words associated with vehicle object(s); identifying the at least one vehicle object based on the digital scan and the one or more words of the speech audio; and displaying owner's manual information associated with the at least one vehicle object.

According to an embodiment of the invention, there is provided a method of providing vehicle owner's manual information. The method includes the steps of: receiving a digital image of a portion of a vehicle; identifying an object of the vehicle in the digital image; associating the object with at least one reference object image stored in an object library comprising a plurality of reference object images; displaying owner's manual information based on the association; and storing at least a portion of the digital image in the object library as a new reference object image for future identifications.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to using a camera in a mobile device together with a software application that includes an object recognition engine to provide a vehicle user with a virtual, user-friendly, vehicle owner's manual. To retrieve the owner's manual, the user places a vehicle component or object within the field-of-view (FOV) of the camera and the recognition engine then identifies the captured vehicle object. The mobile device may then display information associated with the recognized object on the mobile device. In some instances, the mobile device may utilize augmented reality (AR) techniques. Further, the mobile device may receive user speech in conjunction with the captured image to further enhance the recognition or more specifically identify the user's particular query. Also, the software application accuracy may improve the more the user utilizes the virtual owner's manual, as the captured image may be stored and used during future identifications.

This system and method are described below with reference to FIGS. 2-9 as they would be used in connection with the mobile vehicle communications system shown in FIG. 1.

Communications System—

Figure 1:
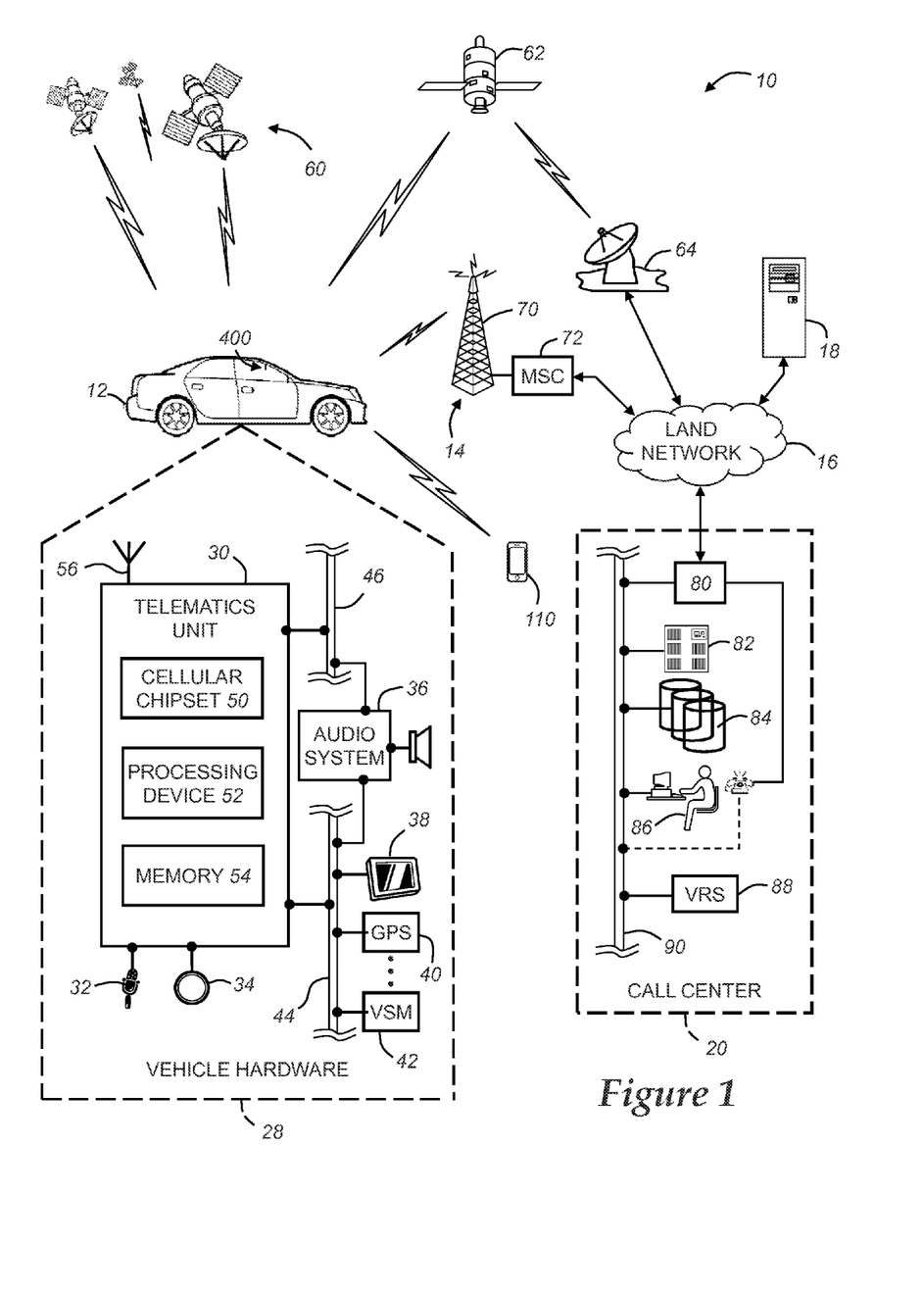
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more camera-enabled mobile devices 110. In some instances, the mobile device may be an electronic device which may be used to make mobile telephone calls across a wide geographic area where transmissions are facilitated by the wireless carrier system 14 (i.e., when the mobile device is connected to the wireless carrier system). And in other embodiments, the mobile device may include camera-enabled eyeglasses (e.g., such as the commercially available Google Glass™) or the like.

Figure 2:
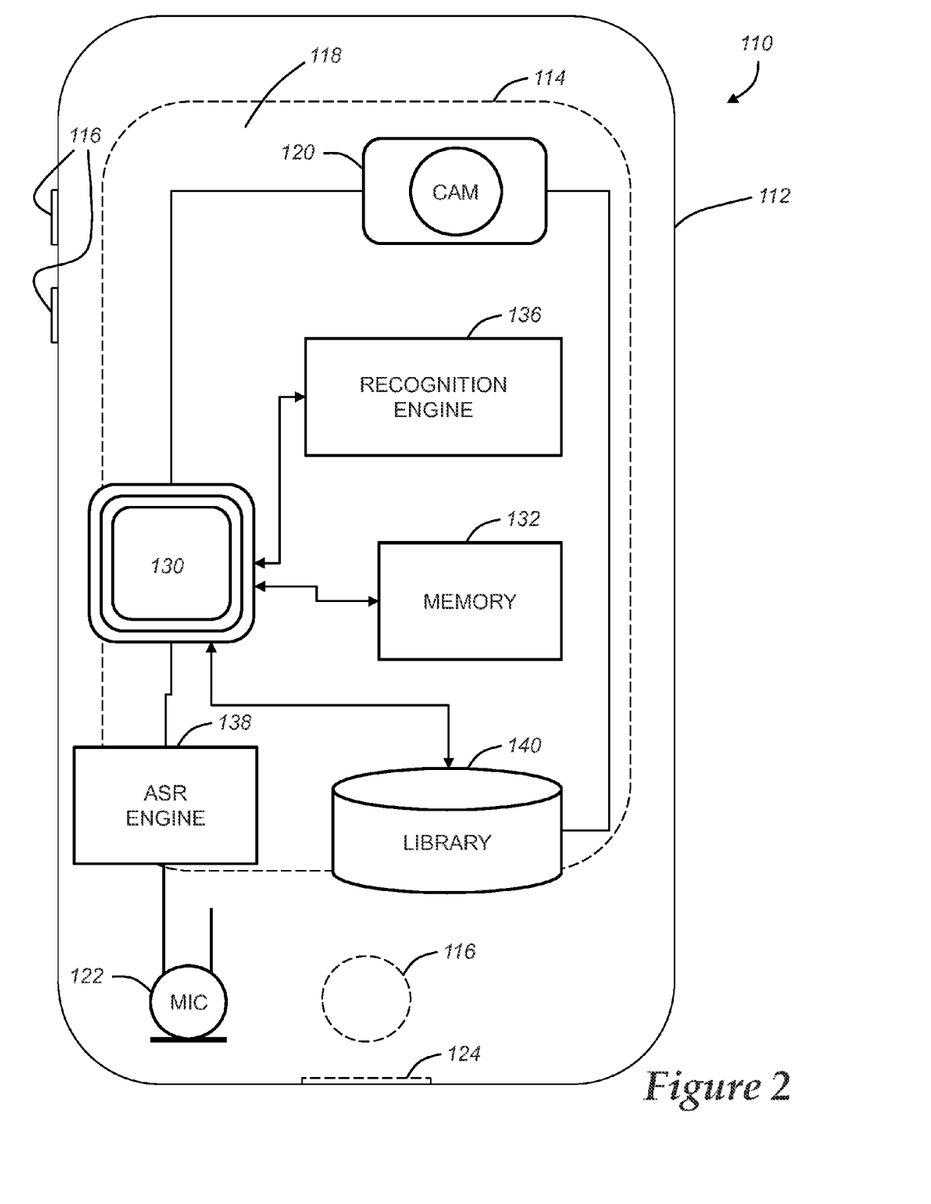
FIG. 2 is a schematic diagram of a mobile device illustrating an internal communication architecture.

As also diagrammatically shown in FIG. 2, the mobile device 110 may include a housing 112 carrying a display 114 and various input/output (I/O) components including one or more tactile switches or buttons 116 (and, e.g., may include a keyboard (not shown), a touch screen 118, an imaging device or camera 120, one or more microphones 122, one or more speakers (not shown), and one or more periphery connectors 124. The mobile device 110 may be operative using a processor 130 and memory 132. As will be described in greater detail below, the mobile device 110 also may have any other hardware, software, and/or firmware enabling the computer program product and methods described herein—e.g., including a library or cache 140 and/or one or more software modules such as an recognition engine 136 and an automatic speech recognition (ASR) engine 138.

The processor 130 shown in FIG. 2 may be directly or indirectly coupled to a number of components, including the camera 120, the recognition engine 136, memory 132, the library 140, and the ASR engine 138. In addition, the camera 120 may be coupled to the library 140, and the ASR engine 138 may be coupled to the microphone 122. Other components, not shown, also may be present—including wireless chipsets, filters, amplifiers, additional processors, additional memory, other I/O interfaces, etc., just to cite a few examples. Thus, FIG. 2 merely illustrates an example of the architecture of some of the various components and is not intended to limit the components of the mobile device 110 nor limit its computing power or other capabilities.

The touch screen 118 may be suitably used as a keyboard or control/operating device, as will be appreciated by skilled artisans. And the camera 120 may include any device capable of capturing or receiving a digital image or scan. Capturing or receiving any digital image should be broadly construed to include taking a photographic image, creating a photographic file, permanently or temporarily storing the photographic file, and/or merely receiving (and/or changing) the input of one or more pixel-detectors on a detector array (not shown) associated with the camera 120 (e.g., by receiving light or heat on the individual pixel-detectors), just to name a few examples. Thus, receiving or capturing a digital image may include activating the detector array without storing any image derived therefrom. In at least some embodiments, the display 114 may provide a viewable image (e.g., a preview) of the targeted image prior to any storing of the digital image.

The processor 130 may be similar to processor 52; and likewise may be any type of device capable of processing electronic instructions including microprocessors, microcontrollers, host processors, controllers, vehicle communication processors, and application specific integrated circuits (ASICs). Processor 130 executes various types of digitally-stored instructions, such as software or firmware programs stored in memory, enabling the mobile device 110 a wide variety of applications. For instance, processor 130 can execute programs or process data to carry out at least a part of the method discussed herein. In at least one embodiment, the processor 130 may be used for object recognition or identification, using memory 132 to execute programming routines and using library 140 to store various digital images, as will be described in greater detail below.

Non-limiting examples of the mobile device 110 include a cellular telephone, a personal digital assistant (PDA), a Smart phone, a personal laptop computer or tablet computer having two-way communication capabilities, a netbook computer, a notebook computer, any wearable computing mobile device (including but not limited to Google Glass™), or any suitable combinations thereof. The mobile device 110 may be used inside or outside of a mobile vehicle (such as the vehicle 12 shown in FIG. 1), and may be coupled to the vehicle by wire or wirelessly (e.g., using short range wireless communication). The mobile device 110 also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 110.

The mobile device 110 and the vehicle 12 may be used together by a person known as the vehicle user such as a vehicle driver or a vehicle passenger. However, the vehicle user does not need to have ownership of the mobile device 110 or the vehicle 12 (e.g., the vehicle user may be an owner or a licensee of either or both).

Method—

The method(s) described herein utilize the above described communication system, including the camera functionality of the mobile device 110 together with a software application on the mobile device to provide a virtual, user-friendly, vehicle owner's manual. In general, the user may place a vehicle component within the field-of-view (FOV) of the mobile device camera and the software application then is used to recognize the captured vehicle component. The mobile device may then display information associated with the recognized component on the mobile device. In some instances, the mobile device 110 may utilize augmented reality (AR) techniques. Further, the mobile device may receive user speech in conjunction with the captured image to further enhance the recognition or more specifically identify the user's particular query. Also, the software application accuracy may improve the more the user utilizes the virtual owner's manual, as the captured image may be stored and used during future identifications.

Figure 3:
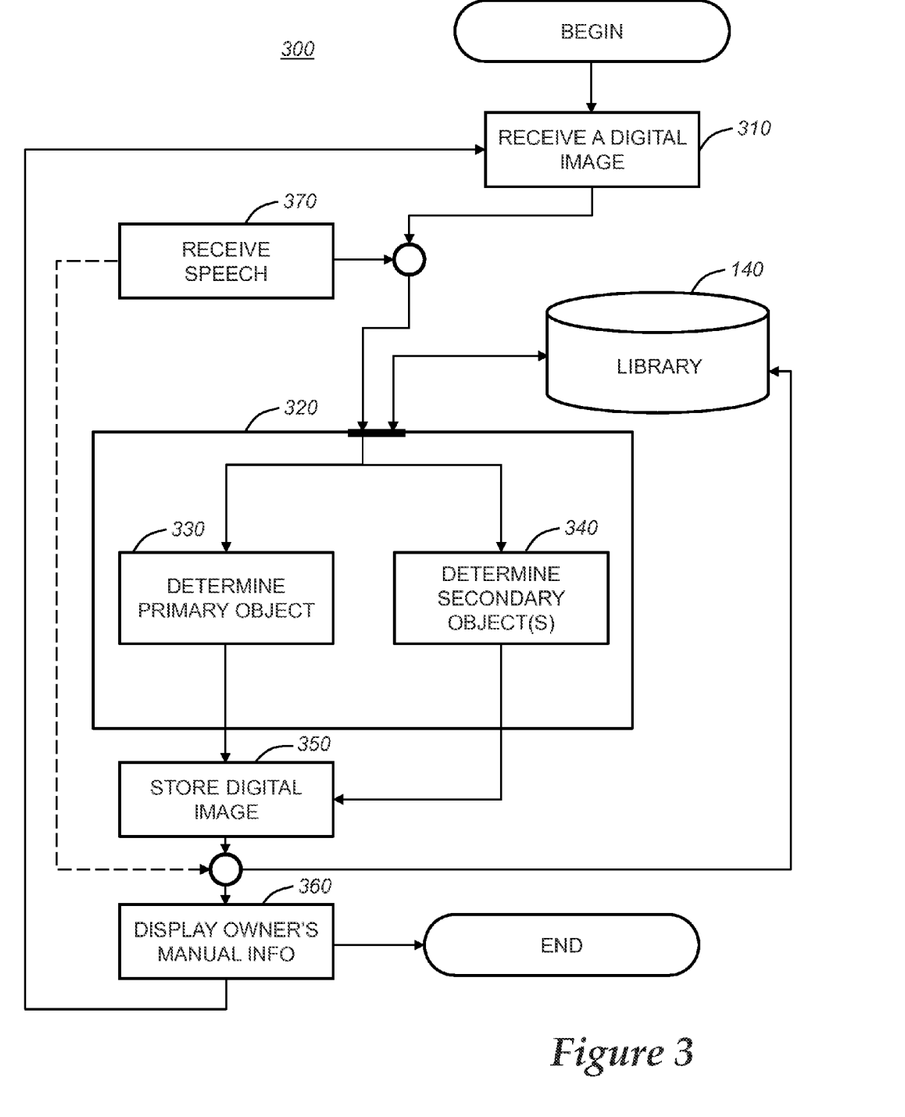
FIG. 3 is a flow diagram illustrating one method of providing owner's manual information.

Turning now to FIG. 3, there is shown a flowchart diagram illustrating a method 300 of the present disclosure. The present method is described with respect to the mobile device 110 and the vehicle 12; however, it will be appreciated that these are merely illustrative elements. The method 300 begins with step 310 as the mobile device 110 receives or captures a digital image of a vehicle object. The digital image of step 310 may or may not be stored on the mobile device 110 (e.g., it may be a picture preview or snapped picture, for example more permanently storable on the device 110). The phrase vehicle object is intended to be construed broadly. Vehicle objects may include components within a vehicle interior, at a vehicle exterior, within a vehicle engine compartment, within a vehicle storage space, etc. Objects may be switches, buttons, instruments, actuating devices, modules, subsystems, text or symbols or icons on any of the foregoing, etc., or any combination thereof. For example, an example of a vehicle object may include a climate control region of a vehicle instrument panel. The vehicle object may be the climate control region itself, or it may be a single switch (e.g., a fan level switch for controlling the volume of air movement) or a grouping of related or associated switches (e.g., the fan level switch and the air delivery mode switches (e.g., controlling the delivery outlets—e.g., defrost, instrument panel, floor, rear, etc.)). In another example, a heated seat switch (or a symbol thereon) and a heated steering wheel switch (or a symbol thereon) each may be vehicle objects, or collectively the switches may be a vehicle object.

Figure 4:
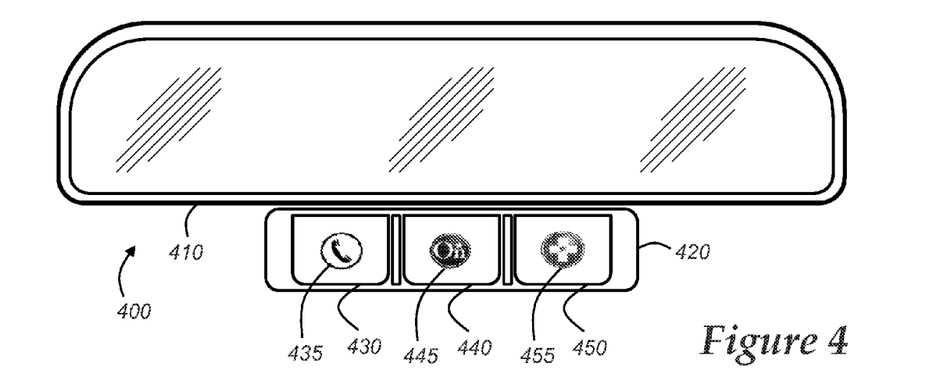
FIG. 4 is a front view of a vehicle mirror assembly.
Figure 5:
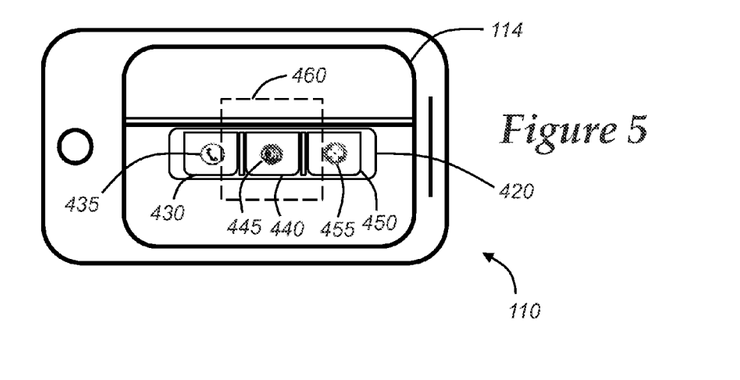
FIG. 5 is a plan view of the mobile device imaging a portion of the vehicle mirror assembly of FIG. 4.

In another example illustrated in FIG. 4, the received digital image of step 310 may capture a rear view mirror assembly 400 having a mirror 410 and a vehicle telephony panel 420 coupled thereto. Thus, the vehicle object may be the mirror 410 or the telephony panel 420 or an individual switch, just to name a few examples. As shown, the telephony panel 420 may include multiple switches including a call switch 430, an advisor switch 440, and an emergency switch 450 (each having a respective symbol 435, 445, 455). FIG. 5 illustrates the mobile device 110 capturing the digital image of the entire telephony panel 420. More particularly, a centralized region 460 of the FOV of the camera 120 includes the advisor switch 440 and only a portion of the other switches 430, 450.

After step 310, the method 300 may proceed to step 320 (FIG. 3). In step 320, the digital image of the vehicle object may be received by the recognition engine 136. In addition, the recognition engine 136 may parse the library 140 comparing the captured digital image (from step 310) to stored reference object images in the library 140 seeking a suitable match or likeness. Every suitable vehicle object may have at least one reference object image; and moreover, each vehicle object may have multiple reference object images. A reference object image may be a 2-dimensional (2-D) or 3-dimensional (3-D) image of an object or a 2-D or 3-D feature of an object (e.g., one or more edges, shapes, patterns, textures, colors, etc.) For a single vehicle object, the library may contain at least one captured or photographic image, at least one non-photographic or graphically-designed image, or both. The photographic image may be captured from different camera angles, under different ambient or environmental settings (e.g., sunlight, cloud-cover, rain, snow, darkness scenarios), and/or having any other suitable differentiation or characteristic to assist in identifying the vehicle object. Examples of suitable characteristics may include lighting characteristics (e.g., images having differences in brightness or contrast) or color characteristics (e.g., images having differences in color hue and/or tone, etc.). The graphic-design image may be configured using computer-aided design software and may include both two- and three-dimensional models.

Upon finding at least one suitable match, the recognition engine 136 in step 320 may associate the matched reference object image(s) with relevant menu items, relevant general data, or relevant specific data from the owner's manual, as discussed below.

Step 320 may include one or more sub-steps 330 and/or 340. In step 330, the recognition engine 136 may determine or identify a primary object in the digital image. For example, the primary object may be located within the centralized region 460 of the FOV (see FIGS. 5-6); however, this is not necessary. And in step 340, the recognition engine 136 may determine or identify one or more secondary objects in the digital image—which may be at least partially located outside of the centralized region 460. Consider FIG. 5 as an example—here, switch 440 may be the only switch located within the centralized region 460 and may be the primary object (as identified by the recognition engine 136), and switches 430, 460 may be located at least partially outside of the centralized region 460 and may be the secondary objects (as identified by the recognition engine 136). It should be appreciated that the entire primary object need not be within the region 460; also, the illustrated relative size of the centralized region 460 is merely an example—other sizes are possible.

It will be appreciated that as the method 300 performs step 320 (and/or its respective sub-steps) the method may perform the recognition, identification, etc. using various image processing techniques image enhancement, filtering, and deblurring, various image analysis techniques including segmentation, morphology, feature extraction (e.g., edge detection), and measurements. For example, recognition of the primary and/or secondary objects may include determining edges of the objects in the image and comparing that to similar edge features extracted from the reference image(s), or colors or combinations of like. Regardless, image processing techniques are known and appreciated by those of skill in the art.

Figure 6:
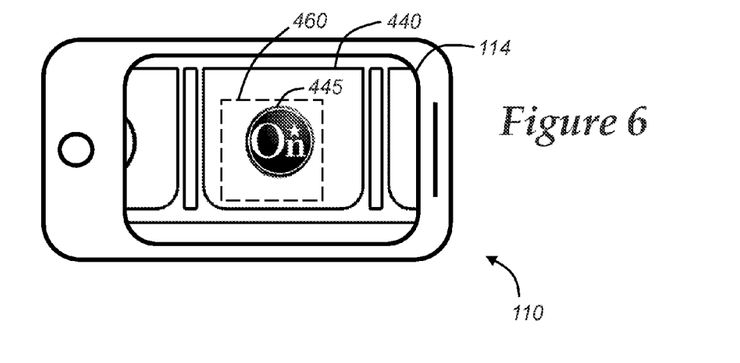
FIG. 6 is a plan view of the mobile device imaging another portion of the vehicle mirror assembly of FIG. 4.

FIG. 6 illustrates another example of primary and secondary objects in the FOV. Here for example, only symbol 445 may be in the centralized region and one or more of the switches 430, 440, 450 may be secondary object(s). This may be adequately captured imagery detail to enable the recognition engine 136 to determine the vehicle object. In fact, the recognition engine 136 may even receive only a portion of the symbol (e.g., 445) to determine its identity. Further, in some embodiments, the recognition engine 136 need not determine a secondary object and may thus proceed with or without step 340.

After step 320 (and steps 330 and/or 340), the method 300 may proceed to step 350 and store the captured digital image (e.g., that shown in the display 114 of FIG. 5 or 6). The digital image may be stored in the library 140 for future identifications, as will be discussed below. Step 350 may store all or a portion of the digital image. For example, the stored portion may only be the identified primary object, or it may be one of the identified secondary objects, or it may be only what is captured within the centralized region 460.

Figure 7:
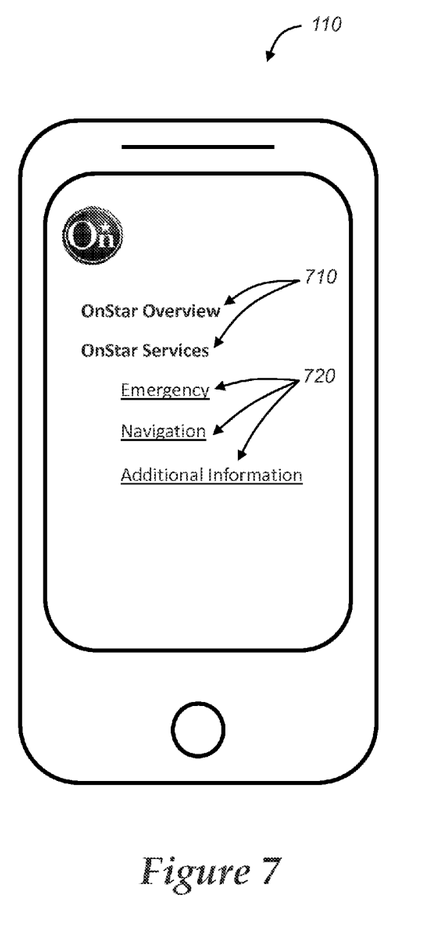
FIG. 7 is a plan view of the mobile device illustrating one method of displaying vehicle owner's manual information.
Figure 8:
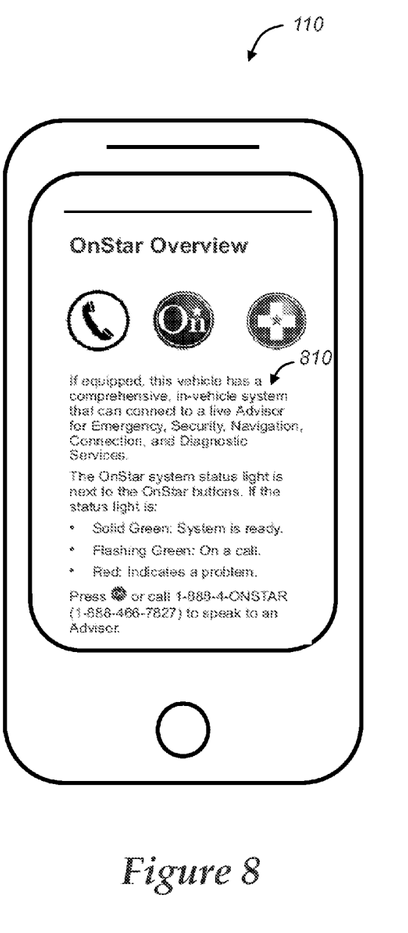
FIG. 8 is a plan view of the mobile device illustrating another method of displaying vehicle owner's manual information.
Figure 9:
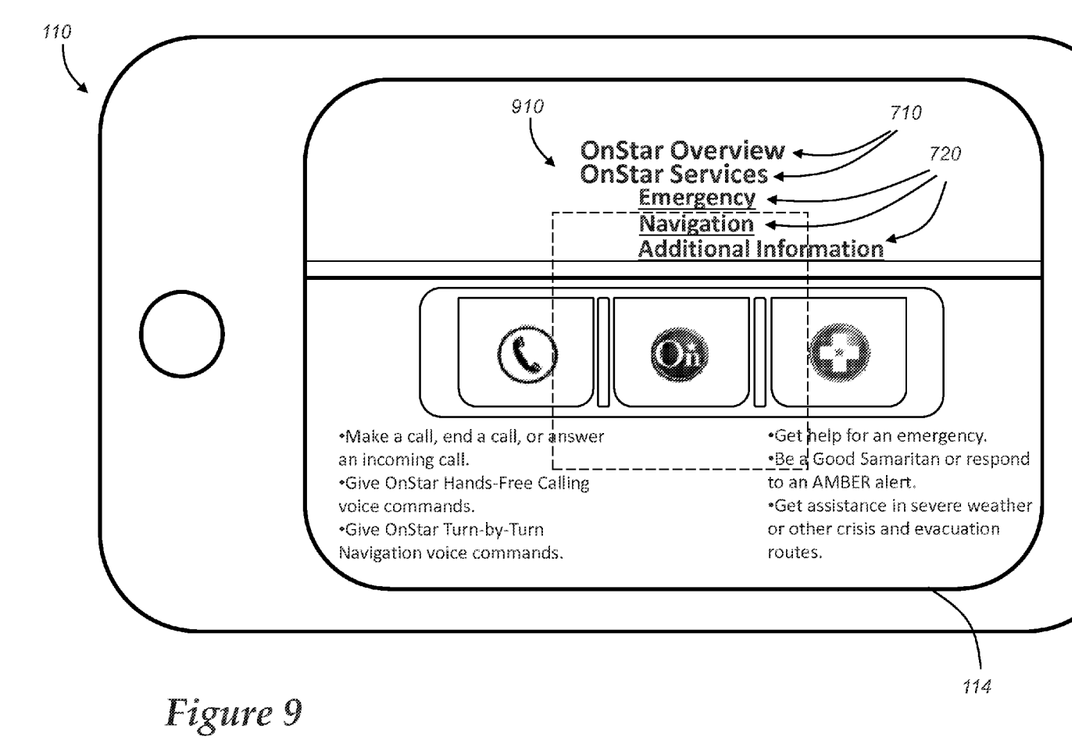
FIG. 9 is a plan view of the mobile device illustrating another method of displaying vehicle owner's manual information.

Method 300 then may proceed to step 360 and display vehicle owner's manual information as illustrated in FIGS. 7, 8, and 9. For example, where the primary object was identified as the advisor switch 440 (or the advisor symbol 445), the display 114 of the mobile device 110 may provide one or more menu items 710 pertaining to or associated with the advisor switch 440. For example, FIG. 7 illustrates an "OnStar Overview" menu item and an "Onstar Services" menu item, as well as several sub-menu items 720 (e.g., "Emergency," "Navigation," and "Additional Information," just to name a few examples).

The step 360 of method 300 also may display vehicle owner's manual information pertinent to both the primary object identified as well as the secondary object(s) identified, as illustrated in FIG. 8. For example, where the primary object was the advisor switch 440 and the secondary objects were the call switch 430 and the emergency switch 450, the display 114 may provide general information or data 810 such an "OnStar Overview" showing all three symbols 435, 445, 455 and their explanation.

Or alternatively as shown in FIG. 9, step 360 of method 300 also may overlay one or more menu items 710 on the digital image (e.g., utilizing AR techniques). For example, the display 114 may provide vehicle owner's manual information pertinent to the primary object, the secondary object(s), or both. In addition, the information pertaining to the primary object may have prominent text or data 910. For example, as used herein prominently displayed data 910 includes vehicle owner's manual information that includes: text having larger font; bold, italicized, or characterized font; font having a different color than other font on the display 114; or any features setting apart the text pertaining to the primary object from other provided text such as flashing font or font having changing brightness, etc. Thus, the vehicle objects identified as secondary may have less prominent displayed features. Of course, other objects may be shown in the display 114 that are not visually identified. For example, the user might hover over the HVAC fan control to have it identified, but related temperature and zone control knobs on the instrument panel may also be shown in the display 114—e.g., enabling the user to repeat the method by selecting an object that was not initially visually identified—thereby providing the user helpful and related information, as the system identifies components having primary and secondary relationships.

Other AR enhancements may include highlighting objects in the mobile device's FOV or display (which may include outlining objects that are recognized). Then, user selection of that highlighted object (e.g., by a user-touch on the device's display) could be used to call up or bring up the associated "user manual" information for that particular object. For example, the objects within the mobile device's FOV could be identified and highlighted even as the camera is moved to scan the surrounding area. Moreover, if too many highlighted objects are recognized (e.g., so as to overcrowd the display), the device may highlight categorical items until the mobile device user enlarges the objects (e.g., by narrowing the FOV). Regardless, in at least one embodiment, highlighting, outlining, etc. may be automatically provided (e.g., to suggest owner's manual information to the user.)

After step 360, the method 300 may end or may await to receive another digital image in step 310 and repeat one or more of the above discussed steps. Moreover, having stored the user-captured digital image in the library 140 as a new reference object image, the recognition engine 136 may have a greater number of reference object images for use during future identifications.

In another embodiment, the method 300 may include receiving user speech in step 370 (FIG. 3), e.g., near or at the time of the camera 120 capturing the digital image. The speech may be processed using known techniques using the ASR engine 138 and provided to the processor 130 and/or the recognition engine 136. Thus, a combination of speech and imagery may be used to determine the primary and/or secondary vehicle objects. Thereafter, the method 300 may proceed as previously described.

Or in an alternative embodiment that includes step 370, the method 300 may receive the digital image in step 310, may associate reference object image(s) using the recognition engine 136 (in step 320), and thereafter receive speech in step 370. Here, for example, the received speech may be used to refine the results displayed in step 360. For example, the system might recognize the climate control system and various objects associated therewith and then receive user speech such as "how do I turn this off?" Thereafter, the displaying owner's manual information step 360 may include refined results pertaining to turning off the forced air or other aspects of the climate control system. In FIG. 3, this alternative embodiment of receiving speech is shown after step 350 (storing a digital image) by way of example; however, this is not required—it could be received prior to step 350 as well.

Of course, other embodiments also exist. For example, speech may be received (in step 370) before and after the recognition engine step 320. Moreover, the method 300 should be construed broadly enough to include performing step 320, thereafter receiving speech (step 370), and then looping back and repeating step 320 again, based on the received speech.

Also, whenever speech is received in steps 370, it may be received before and/or after displaying owner's manual info in step 360. For example, speech may be received (step 370) at any suitable time prior to the displaying step 360—and the speech may be used to determine the object of interest, as previously described. Or speech may or may not be received (step 370) prior to the displaying step 360—and then speech may be received (step 370) after displaying owner's manual information and used to refine the results—thereafter, displaying more refined information from the owner's manual (i.e., repeating step 360). For example, an object or region of the instrument panel may be highlighted or illuminated that pertains to traction, braking, etc. Steps 310, 320 (e.g., 330 and/or 340), 350, 360 (displaying information including the text "traction control"), and/or 370 may be performed, and thereafter, user speech such as "what does traction control mean?" may be received (step 370), and the system may provide additional information on traction control (e.g., via step 360).

The method also may store in the library 140 one or more identifying speech terms (or phrases) associated with one or more vehicle objects. These speech terms may be pre-recorded (e.g., by the user or others) or may be programmed according to known techniques. In addition, speech uttered and associated with a reference object image may be associated stored in the library 140 for use with future identifications by the recognition engine 136 and/or processor 130.

In another embodiment, the method 300 may predict the appropriate menu items to display. For example, the reference object images in the library 140 may be classified according to type, function, location, etc. Thus, a captured digital image may be directly associated with one or more reference object images; or the captured digital image may be indirectly associated (e.g., in a predictive manner) with vehicle objects (and their type, function, location, etc.) other than the directly associated reference object image(s). The predictive manner may occur according to an associated class or classification. Consider the digital image shown in the FOV of FIG. 6—the processor 130 may determine that the user may be interested in more than simply the advisor switch 440 and provide predictive menu items—such as information pertaining to the call switch 430 and emergency switch 450 as well, as shown in FIG. 8.

In another embodiment, the method 300 also may perform step 350 (storing the digital image in the library 140) after step 360 (displaying vehicle owner's manual information). For example, the mobile device 110 may await some feedback indicating that the vehicle owner's manual information provided on the display 114 is desirable or acceptable to the user before storing the newly captured digital image. This feedback may be an "Ok" button or other suitable input. Thus, in at least one embodiment, the method may have a greater confidence that the digital image should be associated with the provided owner's manual information and other reference object images.

The methods described herein may be performed as one or more computer programs executable by one or more computing devices of or in communication with the mobile device 110 to cause the computing device(s) to perform the method, and the various method related data may be stored in any suitable memory (e.g., including memory 132 and/or the library 140). The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

For example, the method may include a computer program product that is a non-transient computer readable memory (e.g., RAM, etc. that may be stored on memory 132) that when executing the program instructions (e.g., via processor 130) carries out the steps of: receiving a digital image (e.g., a picture or live-camera feed) of a portion of a vehicle (e.g., via camera 120); identifying a primary object of the vehicle in the digital image (e.g., using the recognition engine 136); associating the primary object with at least one reference object image stored in an object library comprising a plurality of reference object images (e.g., again using the recognition engine 136); displaying owner's manual information based on the association (e.g., on display 114); and storing the digital image in the object library 140 as a new reference object image for future identifications.

In another illustrative example, the method may include a computer program product that is a non-transient computer readable memory (e.g., RAM, etc. that may be stored on memory 132) that when executing the program instructions (e.g., via processor 130) carries out the steps of: receiving a digital scan (e.g., a picture or live-camera feed) containing at least one vehicle object (e.g., via camera 120); receiving speech audio (e.g., from the user via microphone 122) containing one or more words associated with vehicle object(s); identifying the at least one vehicle object based on the digital scan (e.g., using the recognition engine 136) and the one or more words of the speech audio (e.g., using the ASR engine 138); and displaying owner's manual information associated with the at least one vehicle object (e.g., on display 114).

While the previous two examples illustrate the memory being on the mobile device 110, it should be appreciated that this is merely an example. The memory could be elsewhere as well—e.g., on a remote server used to distribute content to one or more users.

In at least one embodiment, the performed method(s) include computer programs executable using the mobile device processor 130 and memory 132 (and library 140)—including application software stored thereon.

Thus, there has been described a mobile device software application that may receive as input a camera data pertaining to a vehicle component or object, audio/speech data, or both, and based on that data determine what vehicle owner's manual information to display on the mobile device. In addition, the data also may be stored for further determinations.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A computer program product, comprising:
   a non-transitory computer readable medium having stored thereon program instructions for use by a camera-enabled mobile device, wherein, upon execution by the mobile device, the program instructions stored on the computer readable medium cause the mobile device to carry out the steps of:
   receiving a first digital image of a portion of a vehicle, wherein the portion of the vehicle is in a stationary state at a time the first digital image is received;
   identifying a primary object of the vehicle in the first digital image;
   associating the primary object with at least one reference object image previously stored in an object library comprising a plurality of reference object images;
   displaying owner's manual information based on the association;

in response to associating the primary object with the at least one reference object image, adding at least a portion of the first digital image to the object library by storing the at least a portion of the first digital image in the object library as one of the plurality of reference object images, wherein the at least a portion includes the identified primary object; and thereafter, receiving a second digital image and repeating the identifying, associating, and displaying steps with respect to the second digital image, wherein repeating the associating step includes:

parsing a plurality of reference object images in the object library to associate at least one of the plurality of reference object images with a primary object in the second digital image, wherein the parsed plurality of reference object images includes the added at least a portion of the first digital image; and using one or more of the plurality of reference object images as a basis for displaying owner's manual information associated with the second digital image, wherein the used one or more of the plurality of reference object images includes the added at least a portion of the first digital image.

2. The computer program product of claim 1, wherein the identifying step includes determining the identity of the primary object based on the primary object's location within a centralized region of the first digital image.

3. The computer program product of claim 1, wherein the object library includes more than one reference object image for at least some vehicle primary objects.

4. The computer program product of claim 3, wherein for at least some vehicle primary objects, the more than one reference object image includes one or more of the reference object image captured at a first photographic angle, the reference object image captured at a second photographic angle different than the first photographic angle, and a non-photographic version of the reference object image.

5. The computer program product of claim 1, wherein the storing step further comprises one of: storing the entire first digital image in the object library, or storing only a portion of the first digital image in the object library.

6. The computer program product of claim 1, wherein the added at least a portion of the first digital image stored in the object library as one of the plurality of reference object images has at least one different lighting or color characteristic than the previously stored reference object images.

7. The computer program product of claim 1, wherein the displaying step further comprises displaying one or more menu items directly-associated with the primary object, or displaying one or more predictive menu items, wherein the predictive menu items are indirectly-associated with the primary object, or both.

8. The computer program product of claim 1, further comprising automatically highlighting at least one object in the digital scan to suggest owner's manual information that is available to the user.

9. The computer program product of claim 1, wherein the program instructions further comprise identifying a secondary object of the vehicle in the first digital image while concurrently identifying the primary object.

10. The computer program product of claim 9, wherein the program instructions further comprise:

associating the secondary object with at least one reference object image stored in an object library, wherein the displaying step includes:

displaying information directly-associated with both the first and second objects, or displaying information pertaining to a classification of objects to which both the first and second objects are associated.

11. The computer program product of claim 10, wherein the step of identifying the secondary object includes determining the identity of the secondary object based the secondary object's location outside the centralized region of the first digital image.

12. The computer program product of claim 1, wherein the program instructions further comprise:

receiving speech audio containing one or more identifying terms associated with at least one object identified in the first digital image;

determining the one or more identifying terms using an automatic speech recognition (ASR) engine; and determining the owner's manual information to be displayed based on the one or more identifying terms and the identified and associated primary object of the first digital image.

13. A computer program product, comprising:

a non-transitory computer readable medium having stored thereon program instructions for use by a camera-enabled mobile device, wherein, upon execution by the mobile device, the program instructions stored on the computer readable medium cause the mobile device to carry out the steps of:

receiving a digital scan containing at least one vehicle object;

receiving speech audio containing one or more words associated with vehicle object(s);

processing the received speech audio using an automatic speech recognition (ASR) engine in the mobile device;

identifying the at least one vehicle object based on the digital scan and based on the one or more words of the processed speech audio, wherein the identifying step further comprises associating the at least one vehicle object with at least one reference object image stored in an object library of the mobile device that comprises a plurality of reference object images; and in response to the identification, displaying owner's manual information via a display of the mobile device, wherein the owner's manual information is associated with the at least one vehicle object while displaying the at least one vehicle object in the digital scan, wherein, when the received and processed speech audio includes a query associated with the digital scan, the displaying step includes displaying refined owner's manual information that is pertinent to the query.

14. The computer program product of claim 13, further comprising storing the digital scan in the object library as a new reference object image for future identifications, or storing the speech audio in an audio library for future identifications, or both.

15. The computer program product of claim 13, the identifying step further comprising automatically highlighting at least one object in the digital scan to suggest owner's manual information that is available to the user.

16. The computer program product of claim 13, wherein the at least one reference object image includes one or more of a reference object image captured at a first photographic angle, the same reference object image captured at a second photographic angle different than the first photographic angle, and a graphic-design version of the same reference object image.

17. The computer program product of claim 13, wherein the at least one vehicle object includes a first vehicle object and a second vehicle object, wherein the displaying step further comprises concurrently displaying owner's manual information pertaining to both the first and second vehicle objects.

18. The computer program product of claim 17, wherein the first vehicle object is located within a centralized region of the digital scan and the second vehicle object is located at least partially outside of the centralized region, wherein the owner's manual information pertaining to the first vehicle object is displayed more prominently than the owner's manual information pertaining to the second vehicle object.

19. The computer program product of claim 13, wherein the at least one vehicle object is in a stationary state at a time the digital scan is received.

20. A method of providing vehicle owner's manual information, comprising the steps of:
receiving a first digital image of a portion of a vehicle, wherein the portion of the vehicle is in a stationary state at a time the first digital image is received;
identifying an object of the vehicle in the first digital image;
associating the object with at least one reference object image previously stored in an object library comprising a plurality of reference object images;
displaying owner's manual information based on the association;
in response to associating the object with the at least one reference object image, adding at least a portion of the first digital image to the object library by storing the at least a portion of the first digital image in the object library as one of the plurality of reference object images, wherein the at least a portion includes the identified object; and
thereafter, receiving a second digital image and repeating the identifying, associating, and displaying steps with respect to the second digital image,
wherein repeating the associating step includes:
parsing a plurality of reference object images in the object library to associate at least one of the plurality of reference object images with an object in the second digital image, wherein the parsed plurality of reference object images includes the added at least a portion of the first digital image; and
using one or more of the plurality of reference object images as a basis for displaying owner's manual information associated with the second digital image, wherein the used one or more of the plurality of reference object images includes the added at least a portion of the first digital image.

* * * * *